US011646018B2

(12) United States Patent
Maddali et al.

(10) Patent No.: US 11,646,018 B2
(45) Date of Patent: May 9, 2023

(54) DETECTION OF CALLS FROM VOICE ASSISTANTS

(71) Applicant: PINDROP SECURITY, INC., Atlanta, GA (US)

(72) Inventors: Vinay Maddali, Atlanta, GA (US); David Looney, London (GB); Kailash Patil, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 65 days.

(21) Appl. No.: 16/829,705

(22) Filed: Mar. 25, 2020

(65) Prior Publication Data

US 2020/0312313 A1 Oct. 1, 2020

Related U.S. Application Data

(60) Provisional application No. 62/823,503, filed on Mar. 25, 2019.

(51) Int. Cl.
*G10L 15/197* (2013.01)
*G10L 15/18* (2013.01)
(Continued)

(52) U.S. Cl.
CPC ............ *G10L 15/197* (2013.01); *G10L 15/02* (2013.01); *G10L 15/04* (2013.01); *G10L 15/063* (2013.01);
(Continued)

(58) Field of Classification Search
CPC ................. G10L 15/063; G10L 15/142; G10L 2015/0631; G10L 17/00
(Continued)

(56) References Cited

U.S. PATENT DOCUMENTS 4,817,156 A 3/1989 Bahl et al.
4,829,577 A 5/1989 Kuroda et al.
(Continued)

FOREIGN PATENT DOCUMENTS

WO WO-2016/195261 A1 12/2016
WO WO-2017/167900 A1 10/2017

OTHER PUBLICATIONS

Final Office Action for U.S. Appl. No. 16/784,071 dated Oct. 27, 2020 (12 pages).

(Continued)

*Primary Examiner* — Akwasi M Sarpong
(74) *Attorney, Agent, or Firm* — Foley & Lardner LLP

(57) ABSTRACT

Embodiments described herein provide for automatically classifying the types of devices that place calls to a call center. A call center system can detect whether an incoming call originated from voice assistant device using trained classification models received from a call analysis service. Embodiments described herein provide for methods and systems in which a computer executes machine learning algorithms that programmatically train (or otherwise generate) global or tailored classification models based on the various types of features of an audio signal and call data. A classification model is deployed to one or more call centers, where the model is used by call center computers executing classification processes for determining whether incoming telephone calls originated from a voice assistant device, such as Amazon Alexa® and Google Home®, or another type of device (e.g., cellular/mobile phone, landline phone, VoIP).

25 Claims, 3 Drawing Sheets

(51) Int. Cl.
*G10L 15/02* (2006.01)
*G10L 15/04* (2013.01)
*G10L 15/06* (2013.01)
*G10L 15/22* (2006.01)
*G10L 25/84* (2013.01)
*G10L 25/21* (2013.01)
*H04M 3/51* (2006.01)

(52) U.S. Cl.
CPC ......... *G10L 15/1822* (2013.01); *G10L 15/22* (2013.01); *G10L 25/21* (2013.01); *G10L 25/84* (2013.01); *H04M 3/5183* (2013.01); *H04M 2203/558* (2013.01)

(58) Field of Classification Search
USPC ........................................ 704/227, 246, 250
See application file for complete search history.

(56) References Cited

U.S. PATENT DOCUMENTS

| | | | |
|---|---|---|---|
| 4,972,485 A | | 11/1990 | Dautrich et al. |
| 5,072,452 A | | 12/1991 | Brown et al. |
| 5,475,792 A | * | 12/1995 | Stanford ............... G10L 15/063 704/227 |
| 5,598,507 A | * | 1/1997 | Kimber ................. G10L 15/07 704/250 |
| 5,659,662 A | * | 8/1997 | Wilcox .................. G10L 17/04 704/243 |
| 5,835,890 A | | 11/1998 | Matsui et al. |
| 5,995,927 A | | 11/1999 | Li |
| 6,009,392 A | * | 12/1999 | Kanevsky ............. G10L 15/063 704/240 |
| 6,055,498 A | | 4/2000 | Neumeyer et al. |
| 6,094,632 A | | 7/2000 | Hattori |
| 6,141,644 A | | 10/2000 | Kuhn et al. |
| 6,411,930 B1 | | 6/2002 | Burges |
| 6,463,413 B1 | | 10/2002 | Applebaum et al. |
| 6,519,561 B1 | | 2/2003 | Farrell et al. |
| 6,760,701 B2 | | 7/2004 | Sharma et al. |
| 6,882,972 B2 | | 4/2005 | Kompe et al. |
| 6,922,668 B1 | | 7/2005 | Downey |
| 6,975,708 B1 | | 12/2005 | Scherer |
| 7,003,460 B1 | | 2/2006 | Bub et al. |
| 7,209,881 B2 | | 4/2007 | Yoshizawa et al. |
| 7,295,970 B1 | | 11/2007 | Gorin et al. |
| 7,318,032 B1 | | 1/2008 | Chaudhari et al. |
| 7,324,941 B2 | | 1/2008 | Choi et al. |
| 7,739,114 B1 | | 6/2010 | Chen et al. |
| 7,813,927 B2 | | 10/2010 | Navratil et al. |
| 8,112,160 B2 | | 2/2012 | Foster |
| 8,160,811 B2 | | 4/2012 | Prokhorov |
| 8,160,877 B1 | | 4/2012 | Nucci et al. |
| 8,484,023 B2 | | 7/2013 | Kanevsky et al. |
| 8,484,024 B2 | | 7/2013 | Kanevsky et al. |
| 8,554,563 B2 | | 10/2013 | Aronowitz |
| 8,712,760 B2 | | 4/2014 | Hsia et al. |
| 8,886,663 B2 | | 11/2014 | Gainsboro et al. |
| 8,903,859 B2 | | 12/2014 | Zeppenfeld et al. |
| 9,042,867 B2 | | 5/2015 | Gomar |
| 9,064,491 B2 | | 6/2015 | Rachevsky et al. |
| 9,336,781 B2 | | 5/2016 | Scheffer et al. |
| 9,343,067 B2 | | 5/2016 | Ariyaeeinia et al. |
| 9,355,646 B2 | | 5/2016 | Oh et al. |
| 9,373,330 B2 | | 6/2016 | Cumani et al. |
| 9,401,143 B2 | | 7/2016 | Senior et al. |
| 9,401,148 B2 | | 7/2016 | Lei et al. |
| 9,406,298 B2 | | 8/2016 | Cumani et al. |
| 9,431,016 B2 | | 8/2016 | Aviles-Casco et al. |
| 9,444,839 B1 | | 9/2016 | Faulkner et al. |
| 9,454,958 B2 | | 9/2016 | Li et al. |
| 9,460,722 B2 | | 10/2016 | Sidi et al. |
| 9,466,292 B1 | | 10/2016 | Lei et al. |
| 9,502,038 B2 | * | 11/2016 | Wang ................... G10L 17/04 |
| 9,514,753 B2 | | 12/2016 | Sharifi et al. |
| 9,558,755 B1 | | 1/2017 | Laroche et al. |
| 9,584,946 B1 | | 2/2017 | Lyren et al. |
| 9,620,145 B2 | | 4/2017 | Bacchiani et al. |
| 9,626,971 B2 | | 4/2017 | Rodriguez et al. |
| 9,633,652 B2 | | 4/2017 | Kurniawati et al. |
| 9,641,954 B1 | * | 5/2017 | Typrin .................. H04W 4/16 |
| 9,665,823 B2 | | 5/2017 | Saon et al. |
| 9,685,174 B2 | | 6/2017 | Karam et al. |
| 9,875,739 B2 | | 1/2018 | Ziv et al. |
| 9,875,742 B2 | | 1/2018 | Gorodetski et al. |
| 9,875,743 B2 | | 1/2018 | Gorodetski et al. |
| 9,881,617 B2 | | 1/2018 | Sidi et al. |
| 9,930,088 B1 | * | 3/2018 | Hodge ................ H04L 65/4015 |
| 9,984,706 B2 | * | 5/2018 | Wein .................... G10L 25/78 |
| 10,277,628 B1 | * | 4/2019 | Jakobsson ............ H04L 63/1416 |
| 10,325,601 B2 | | 6/2019 | Khoury et al. |
| 10,347,256 B2 | | 7/2019 | Khoury et al. |
| 10,404,847 B1 | * | 9/2019 | Unger ................. H04M 1/6041 |
| 10,462,292 B1 | | 10/2019 | Stephens |
| 10,506,088 B1 | | 12/2019 | Singh |
| 10,554,821 B1 | | 2/2020 | Koster |
| 10,638,214 B1 | * | 4/2020 | Delhoume .......... G06F 3/03547 |
| 10,659,605 B1 | * | 5/2020 | Braundmeier .......... G06F 9/542 |
| 10,679,630 B2 | | 6/2020 | Khoury et al. |
| 11,069,352 B1 | * | 7/2021 | Tang ..................... G10L 15/22 |
| 2002/0095287 A1 | | 7/2002 | Botterweck |
| 2002/0143539 A1 | | 10/2002 | Botterweck |
| 2003/0231775 A1 | * | 12/2003 | Wark .................... G10L 25/78 704/E15.005 |
| 2003/0236663 A1 | * | 12/2003 | Dimitrova ............. G10L 17/00 704/E15.005 |
| 2004/0218751 A1 | | 11/2004 | Colson et al. |
| 2004/0230420 A1 | | 11/2004 | Kadambe et al. |
| 2005/0038655 A1 | | 2/2005 | Mutel et al. |
| 2005/0039056 A1 | | 2/2005 | Bagga et al. |
| 2005/0286688 A1 | | 12/2005 | Scherer |
| 2006/0058998 A1 | | 3/2006 | Yamamoto et al. |
| 2006/0111905 A1 | | 5/2006 | Navratil et al. |
| 2006/0293771 A1 | | 12/2006 | Tazine et al. |
| 2007/0019825 A1 | | 1/2007 | Marumoto et al. |
| 2007/0189479 A1 | | 8/2007 | Scherer |
| 2007/0198257 A1 | | 8/2007 | Zhang et al. |
| 2007/0294083 A1 | | 12/2007 | Bellegarda et al. |
| 2008/0195389 A1 | | 8/2008 | Zhang et al. |
| 2008/0312926 A1 | | 12/2008 | Vair et al. |
| 2009/0265328 A1 | | 10/2009 | Parekh et al. |
| 2010/0131273 A1 | | 5/2010 | Aley-Raz et al. |
| 2010/0262423 A1 | | 10/2010 | Huo et al. |
| 2011/0010173 A1 | | 1/2011 | Scott et al. |
| 2012/0173239 A1 | | 7/2012 | Asenjo et al. |
| 2012/0185418 A1 | | 7/2012 | Capman et al. |
| 2013/0041660 A1 | | 2/2013 | Waite |
| 2013/0080165 A1 | | 3/2013 | Wang et al. |
| 2013/0300939 A1 | | 11/2013 | Chou et al. |
| 2014/0046878 A1 | | 2/2014 | Lecomte et al. |
| 2014/0053247 A1 | | 2/2014 | Fadel |
| 2014/0081640 A1 | | 3/2014 | Farrell et al. |
| 2014/0278412 A1 | | 9/2014 | Scheffer et al. |
| 2014/0337017 A1 | | 11/2014 | Watanabe et al. |
| 2015/0127336 A1 | | 5/2015 | Lei et al. |
| 2015/0149165 A1 | | 5/2015 | Saon |
| 2015/0161522 A1 | | 6/2015 | Saon et al. |
| 2015/0189086 A1 | | 7/2015 | Romano et al. |
| 2015/0199960 A1 | | 7/2015 | Huo et al. |
| 2015/0269931 A1 | * | 9/2015 | Senior .................. G10L 15/063 704/245 |
| 2015/0310008 A1 | | 10/2015 | Thudor et al. |
| 2015/0334231 A1 | | 11/2015 | Rybak et al. |
| 2015/0348571 A1 | | 12/2015 | Inaka et al. |
| 2015/0356630 A1 | * | 12/2015 | Hussain ................ H04L 51/212 705/14.69 |
| 2015/0365530 A1 | * | 12/2015 | Kolbegger .......... H04M 3/2281 379/88.01 |
| 2016/0019883 A1 | | 1/2016 | Aronowitz |
| 2016/0028434 A1 | | 1/2016 | Kerpez et al. |
| 2016/0078863 A1 | | 3/2016 | Chung et al. |
| 2016/0240190 A1 | | 8/2016 | Lee et al. |
| 2016/0275953 A1 | | 9/2016 | Sharifi et al. |
| 2016/0284346 A1 | | 9/2016 | Visser et al. |

(56) References Cited

U.S. PATENT DOCUMENTS

| | | | |
|---|---|---|---|
| 2016/0314790 | A1 | 10/2016 | Tsujikawa et al. |
| 2016/0343373 | A1 | 11/2016 | Ziv et al. |
| 2017/0069313 | A1 | 3/2017 | Aronowitz |
| 2017/0098444 | A1* | 4/2017 | Song ................... G10L 15/02 |
| 2017/0111515 | A1 | 4/2017 | Bandyopadhyay et al. |
| 2017/0126884 | A1* | 5/2017 | Balasubramaniyan ..................... H04L 43/0829 |
| 2017/0142150 | A1 | 5/2017 | Sandke et al. |
| 2017/0169816 | A1* | 6/2017 | Blandin ............... G06F 16/683 |
| 2017/0230390 | A1 | 8/2017 | Faulkner et al. |
| 2018/0082691 | A1 | 3/2018 | Khoury et al. |
| 2018/0152558 | A1* | 5/2018 | Chan ..................... H04W 4/16 |
| 2018/0249006 | A1* | 8/2018 | Dowlatkhah ........ H04B 7/0417 |
| 2018/0295235 | A1* | 10/2018 | Tatourian .......... H04M 3/42042 |
| 2018/0337962 | A1 | 11/2018 | Ly et al. |
| 2019/0037081 | A1 | 1/2019 | Rao et al. |
| 2019/0172476 | A1* | 6/2019 | Wung ................. G10L 21/0232 |
| 2019/0180758 | A1 | 6/2019 | Washio |
| 2019/0238956 | A1* | 8/2019 | Gaubitch ................. H04Q 3/70 |
| 2019/0297503 | A1* | 9/2019 | Traynor ............... H04L 9/3271 |
| 2020/0137221 | A1 | 4/2020 | Dellostritto et al. |
| 2020/0195779 | A1* | 6/2020 | Weisman ............... G06N 20/20 |
| 2020/0252510 | A1* | 8/2020 | Ghuge .................. G10L 15/187 |
| 2020/0312313 | A1* | 10/2020 | Maddali ............. H04M 3/5183 |
| 2020/0396332 | A1 | 12/2020 | Gayaldo |
| 2021/0084147 | A1* | 3/2021 | Kent .................... H04L 63/1433 |

OTHER PUBLICATIONS

International Preliminary Report on Patentability for PCT/US2020/017051 dated Aug. 19, 2021 (11 pages).

Notice of Allowance for U.S. Appl. No. 16/784,071 dated Jan. 27, 2021 (14 pages).

Fu et al., "SNR-Aware Convolutional Neural Network Modeling for Speech Enhancement", Interspeech 2016, vol. 2016, Sep. 8, 2016, pp. 3768-3772, XP055427533, ISSN: 1990-9772, DOI: 10.21437/Interspeech.2016-211.

Ahmad et al., A unique approach in text independent speaker recognition using MFCC feature sets and probabilistic neural network, In 2015 Eighth International Conference on Advances in Pattern Recognition (ICAPR), pp. 1-6, IEEE, 2015.

Anguera, et al., "Partial sequence matching using an Unbounded Dynamic Time Warping algorithm," IEEE ICASSP, Apr. 2010, pp. 3582-3585.

Atrey, et al., "Audio based event detection for multimedia surveillance", Acoustics, Speech and Signal Processing, 2006, ICASSP 2006 Proceedings, 2006 IEEE International Conference on vol. 5, IEEE, 2006.

Baraniuk, "Compressive Sensing [Lecture Notes]", IEEE Signal Processing Magazine, vol. 24, Jul. 2007, pp. 1-9.

Buera, et al., "Unsupervised data-driven feature vector normalization with acoustic model adaptation for robust speech recognition", IEEE transactions on audio, speech, and language processing, vol. 18, No. 2, 2010, pp. 296-309.

Campbell, "Using Deep Belief Networks for Vector-Based Speaker Recognition", Proceedings of Interspeech 2014, Sep. 14, 2014, pp. 676-680, XP055433784.

Castaldo et al., "Compensation of Nuisance Factors for Speaker and Language Recognition," IEEE Transactions on Audio, Speech and Language Processing, ieeexplore.ieee.org, vol. 15, No. 7, Sep. 2007.

Cumani, et al., "Factorized Sub-space Estimation for Fast and Memory Effective i-Vector Extraction", IEEE/ACM TASLP, vol. 22, Issue 1, Jan. 2014, pp. 248-259.

Dehak, et al., "Front-end factor analysis for speaker verification", IEEE Transactions on Audio, Speech, and Language Processing, vol. 19, No. 4, (2011), pp. 788-798.

El-Khoury, et al., "Improved speaker diarization system for meetings", Acoustics, Speech and Signal Processing, 2009, ICASSP 2009, IEEE International Conference on IEEE, 2009.

Gao, et al., "Dimensionality Reduction via Compressive Sensing", Pattern Recognition Letters 33, Elsevier Science BV 0167-8655, 2012.

Garcia-Romero et al., "Unsupervised Domain Adaptation for i-vector Speaker Recognition," Odyssey 2014, pp. 260-264.

Ghahabi et al., "Restricted Boltzmann Machine Supervectors for Speaker Recognition," 2015 IEEE International Conference on Acoustics, Speech and Signal Processing (ICASSP), IEEE, Apr. 19, 2015. pp. 4804-4808, XP033187673.

Gish, et al., "Segregation of speakers for speech recognition and speaker identification", Acoustics, Speech, and Signal Processing, 1991, ICASSP-91, 1991 International Conference on IEEE, 1991.

Huang, et al., "A blind segmentation approach to acoustic event detection based on i-vector", Interspeech, 2013.

International Preliminary Report on Patentability and Written Opinion issued in corresponding International Application No. PCT/US2017/052335 dated Mar. 19, 2019.

International Preliminary Report on Patentability and Written Opinion of the International Searching Authority issued in corresponding International Application No. PCT/US2017/039697 with Date of issuance Jan. 1, 2019.

International Preliminary Report on Patentability and Written Opinion of the International Searching Authority issued in International Application No. PCT/US2017/052293 dated Mar. 19, 2019.

International Preliminary Report on Patentability and Written Opinion of the International Searching Authority issued in International Application No. PCT/US2017/052316 dated Mar. 19, 2019.

International Search Report (PCT/ISA/210) issued in the corresponding International Application No. PCT/US2017/039697, dated Sep. 20, 2017.

International Search Report and The Written Opinion of the International Searching Authority, or the Declaration issued in International Application No. PCT/US20/17051 dated Apr. 23, 2020.

International Search Report and Written Opinion in corresponding PCT Application PCT/US2017/052335, dated Dec. 8, 2017, 10 pages.

International Search Report issued in corresponding International Application No. PCT/US2017/052293 dated Dec. 21, 2017.

International Search Report issued in corresponding International Application No. PCT/US2017/052316 dated Dec. 21, 2017.

Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].

Kenny, "A Small Footprint i-Vector Extractor" Proc. Odyssey Speaker and Language Recognition Workshop, Singapore, Jun. 25, 2012, 6 pages.

Khoury et al., "Combining transcription-based and acoustic-based speaker identifications for broadcast news," ICASSP, Kyoto, Japan, 2012, pp. 4377-4380.

Khoury et al., "Hierarchical speaker clustering methods for the NIST i-vector challenge," Odyssey 2014, pp. 254-259.

Kockmann et al., "Syllable Based Feature-Contours for Speaker Recognition," Proc. 14th International Workshop on Advances, 2008.

Lei et al., "A Novel Scheme for Speaker Recognition Using a Phonetically-aware Deep Neural Network", Proceedings on ICASSP, Florence, Italy, IEEE Press, 2014, pp. 1695-1699.

Luque, et al., "Clustering initialization based on spatial information for speaker diarization of meetings", Ninth Annual Conference of the International Speech Communication Association, 2008.

McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.

Meignier, et al., "LIUM SpkDiarization: an open source toolkit for diarization", CMU SPUD Workshop, 2010.

Novoselov, et al., "SIC speaker recognition system for the NIST i-vector challenge." Odyssey: The Speaker and Language Recognition Workshop. 2014.

Office Action dated Jan. 23, 2020, issued in corresponding Canadian Application No. 3,036,561, 5 pages.

(56) References Cited

OTHER PUBLICATIONS

Oguzhan et al., "Recognition of acoustic Events Using deep Neural Networks", 2014 22nd European Signal Processing Conference (EUSiPCO), Sep. 1, 2014, pp. 506-510, XP032681786.

Pigeon, et al., "Applying logistic regression to the fusion of the NIST'99 1-speaker submissions", Digital Signal Processing Oct. 1-3, 2000, pp. 237-248.

Prazak, et al., "Speaker diarization using PLDA-based speaker clustering", Intelligent Data Acquisition and Advanced Computing Systems (IDAACS), 2011 IEEE 6th International Conference on vol. 1, IEEE, 2011.

Prince, et al., "Probabilistic, Linear Discriminant Analysis for Inferences about Identity," Proceedings of the International Conference on Computer Vision, Oct. 14-21, 2007.

Richardson, et al., "Channel Compensation for Speaker Recognition using MAP Adapted PLDA and Denoising DNNs", Proc. Speaker Lang. Recognit. Workshop, Jun. 22, 2016, pp. 225-230.

Richardson, et al., "Deep Neural Network Approaches to Speaker and Language Recognition", IEEE Signal Processing Letters, vol. 22, No. 10, Oct. 2015, pp. 1671-1675.

Richardson, et al., "Speaker Recognition Using Real vs Synthetic Parallel Data for DNN Channel Compensation", Interspeech, 2016.

Rouvier, et al., "An open-source state-of-the-art toolbox for broadcast news diarization", Interspeech. 2013.

Scheffer et al., "Content matching for short duration speaker recognition", Interspeech, Sep. 14-18, 2014, pp. 1317-1321.

Schmidt, et al., "Large-scale speaker identification," ICASSP, 2014, pp. 1650-1654.

Shajeesh, et al., "Speech enhancement based on Savilzky-Golay smoothing filter", International Journal of Computer Applications, vol. 57, No. 21, 2012.

Shum, et al., "Exploiting intra-conversation variability for speaker diarization", Twelfth Annual Conference of the International Speech Communication Association, 2011.

Snyder et al., Time delay deep neural network-based universal background models for speaker recognition, In 2015 IEEE Workshop on Automatic Speech Recognition and Understanding (ASRU) pp. 92-97, IEEE, 2015.

Solomonoff, et al., "Nuisance Attribute Projection", Speech Communication, Elsevier Science BV, Amsterdam, The Netherlands, May 1, 2007.

Sturim et al., "Speaker Linking and Applications Using Non-Parametric Hashing Methods," Interspeech, Sep. 2016.

Temko, et al., "Acoustic event detection in meeting-room environments", Pattern Recognition Letters, vol. 30, No. 14, 2009, pp. 1281-1288.

Temko, et al., "Classification of acoustic events using SVM-based clustering schemes", Pattern Recognition, vol. 39, No. 4, 2006, pp. 682-694.

Variani et al., "Deep neural networks for small footprint text-dependent speaker verification", 2014 IEEE International Conference On Acoustics, Speech and Signal Processing (ICASSP), IEEE, May 4, 2014, pp. 4052-4056, XP032617560, DOI: 10.1109/ICASSP. 2014.6854363 [retrieved on Jul. 11, 2014].

Written Opinion of the International Searching Authority {PCT/ ISA/237) issued in the corresponding International Application No. PCT/U52017/039697, dated Sep. 20, 2017.

Xu, et al., "Rapid Computation of i-Vector" Odyssey, Bilbao, Spain, Jun. 21-34, 2016, pp. 47-52.

Xue, et al., "Fast query by example of environmental sounds via robust and efficient cluster-based indexing", Acoustics, Speech and Signal Processing, 2008, ICASSP 2008, IEEE International Conference on IEEE, 2008.

Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/ fe6e53e65bced5736480afe34b6c16728408.pdf [retrieved on Sep. 25, 2017].

Zhang et al., "Extracting Deep Neural Network Bottleneck Features using Low-rank Matrix Factorization", IEEE, ICASSP, 2014.

Zheng et al., An experimental study of speech emotion recognition based on deep convolutional neural networks, 2015 International Conference on Affective Computing & Intelligent Interaction (ACII), pp. 827-831, 2015.

Communication pursuant to Article 94(3) EPC issued in corresponding Application No. EP 17778046.7 dated Jun. 16, 2020.

International Search Report and the Written Opinion of the International Searching Authority issued in International Application No. PCT/US2020/24709 dated Jun. 19, 2020.

D.Etter and C.Domniconi, "Multi2Rank: Multimedia Multiview Ranking," 2015 IEEE International Conference on Multimedia Big Data, 2015, pp. 80-87. (Year 2015).

T.C.Nagavi, S.B. Anusha, P. Monisha and S.P.Poomima, "Content based audio retrieval with MFCC feature extraction, clustering and sort-merge techniquest," 2013 Fourth International Conference on Computing, Communications and Networking Technologies (ICCCNT), 2013, pp. 1-6. (Year 2013).

\* cited by examiner

DETECTION OF CALLS FROM VOICE ASSISTANTS

CROSS-REFERENCE TO RELATED APPLICATIONS

This application claims priority to U.S. Provisional Application No. 62/823,503, filed Mar. 25, 2019, which is hereby incorporated by reference in its entirety.

This application is related to U.S. Pat. No. 10,141,009, entitled "System And Method For Cluster-Based Audio Event Detection," filed May 31, 2017; U.S. Pat. No. 10,325,601, entitled "Speaker Recognition In The Call Center," filed Sep. 19, 2017; and U.S. application Ser. No. 16/784,071, entitled "Systems And Methods Of Gateway Detection In A Telephone Network," filed Feb. 6, 2020, each of which is hereby incorporated herein in its entirety.

TECHNICAL FIELD

This application generally relates to systems and methods of modeling and classifying incoming calls based on features extracted from the audio signals and one or more machine-learning algorithms.

BACKGROUND

Voice assistant software programs, such as Amazon Alexa®, Google Assistant®, and Apple Siri®, are becoming more prevalent in households as the software is integrated into an ever-increasing number of voice assistant devices, like Amazon Echo® and Google Home®. Voice assistant devices (sometimes called "smart speakers") are intelligent, computing devices controlled by a voice assistant software program. These voice assistant devices execute programmatic routines (sometimes called "skills") that perform and provide certain tasks and capabilities in response to a user's voice commands. The capabilities of voice assistant devices continue to improve and expand. One recently introduced functionality includes the capability of making telephone calls. Recent studies indicate an increasing amount of phone calls to call centers. With the increased number of calls being made to call centers, and the growth of voice assistant devices capable of placing telephone calls, there is likely to be a sharp increase in the number of phone calls to call centers originating from these types of devices.

Organizations and infrastructures, such as corporate call centers, often perform various processes or tasks that ingest and consider various types of data, associated with a caller, a caller device, or other information (e.g., carrier network metadata). For example, a call center may collect information about the caller for authentication purposes. In this example, the call center can use the caller's Automatic Number Identification (ANI) value (or phone number) to authenticate the caller. In other examples, the processes or tasks of the call center can ingest and evaluate the caller's voice, the type of device the caller is calling from, and other information. For certain types of caller-devices, a technical problem can arise when the type of the caller-device must be collected by call center systems in order to perform various tasks and processes. For instance, there may be technical challenge differentiating various types of devices that seemingly having the same phone number. When a user instructs a voice assistant device to initiate a telephone call, the voice assistant device utilizes the telephony functionality and/or the telephone number of a telecommunications device, which is usually a cellular or landline phone. In operation, the voice assistant device makes a Voice over Internet Protocol (VoIP) call to a Public Switched Telephone Network (PSTN), while the metadata associated with the call retains whichever phone number the user selects, which is typically the phone number registered to the user for the user's cellular or landline phone. While this configuration is convenient for the user, there is a mismatch between the device-type portrayed from the phone number (in the metadata of the call) and the actual device-type. As mentioned, the actual device-type, and the differences between the possible types of caller-devices, can be characterized by various audio attributes that can have a significant impact in a number of applications, including software applications or computing systems that analyze calls and make decisions based on audio and metadata of the calls. The systems implementing such software applications or computing systems need to be able to distinguish calls that originate from voice assistant device against calls that originate from cell phones, even when the devices convey the same phone number to the systems.

Speaker recognition applications or computing systems, for example, could take advantage of having prior knowledge of the device-type that provided an audio signal to be processed for calibration to improve accuracy. Additional examples where such device-type classification would be useful is in audio forensics, as well as any call-based, device-type identification applications or systems.

In view of the problems above, it would be beneficial for call center systems to be capable of automatically classifying and recognizing the types of devices being employed by callers. In particular, it would be beneficial to have a means for programmatically determining that a caller-device is a voice assistant device, a telephone (e.g., mobile/cellular phone), or a VoIP call (e.g., VoIP protocols implemented via software executed by a processor). Given the expected increase in voice assistant devices being employed, it would be particular beneficial to detect that a call has originated from such a device.

A technical hurdle is that are no datasets or known programmatic approaches for detecting voice assistant devices specifically. Device and channel characteristics can be used to detect calls from a certain caller. This can be extended to classifying International from domestic, and cell, landline and VoIP based calls from each other. But there are no known datasets, software tools, or other means of reliably and efficiently detecting and tracking calls that have originated from voice assistant devices.

What is therefore needed is a means for programmatically and automatically distinguishing incoming calls that have originated from voice assistant devices, and incoming calls that have originated from other types of devices, regardless of the mode of usage.

SUMMARY

Disclosed herein are systems and methods capable of addressing the above-described shortcomings and may also provide any number of additional or alternative benefits and advantages. Embodiments described herein provide for a method or system that execute machine learning algorithms that programmatically trains (or otherwise generates) classification models based on the various types of features of an audio signal and call data. In some implementations, the classification models are used for determining whether an incoming telephone call has originated from a voice assistant device, such as Amazon Alexa® and Google Home®, or some other type of device.

In one embodiment, a computer-implemented method detects certain types of caller devices. The method comprises receiving, by a computer, call data for an incoming call, the call data comprising an audio signal and metadata; extracting, by a computer, one or more feature-types from the audio signal of the call data for the incoming call; generating, by the computer using a classifier model, a device-type score for the incoming call based upon the one or more feature-types and the metadata of the call data for the incoming call, wherein the classifier model is trained according to the call data for a plurality of calls; and determining, by the computer, that the incoming call originated from a voice assistant device in response to determining that the device-type score for the incoming call satisfies a threshold value.

In another embodiment, a computer-implemented method detects certain types of caller devices. The method comprises receiving, by a computer, call data for a plurality of calls, the call data for each respective call comprising an audio signal and metadata of the respective call, wherein the plurality of calls includes one or more voice assistant calls that involved one or more voice assistant devices, the call data for each voice assistant call indicates a device-type is a voice assistant device; for each respective call in the plurality of calls, extracting, by the computer, one or more feature-types from the audio signal of the call data; training, by the computer, a classification model based on the one or more feature-types extracted from the call data of the plurality of calls, wherein the classifier model is trained according to one or more machine-learning algorithms used for the one or more feature-types; generating, by the computer, one or more standardization parameters for the classification model, wherein each feature-type is normalized according to a corresponding standardization parameter; and storing, by the computer, the classification model in a machine-readable storage.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
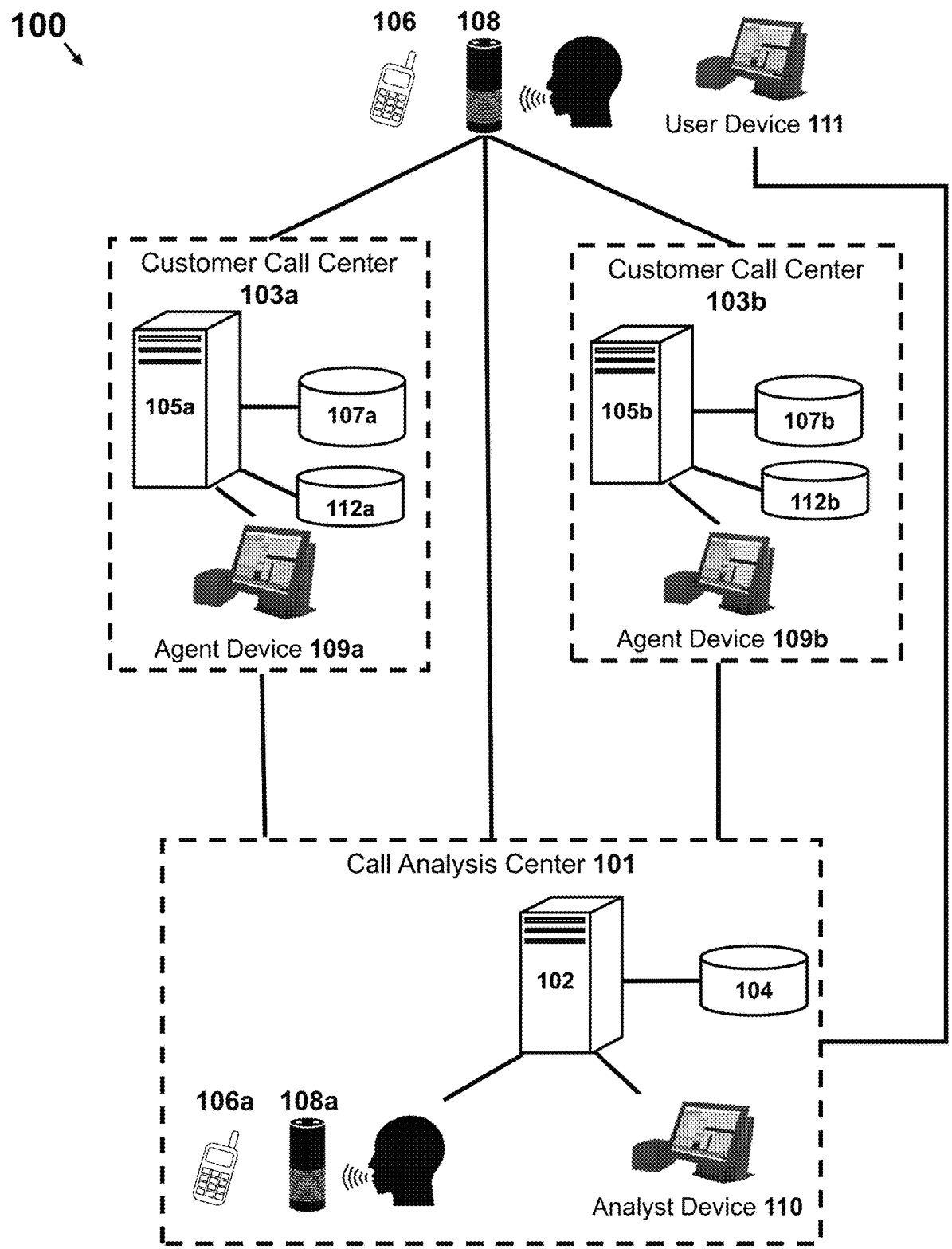
FIG. 1 shows components of a system for receiving telephone calls, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein provide for systems and methods for detecting phone calls that originated from voice assistant devices (e.g., Amazon Echo®, Google Home®). Voice assistant devices are smart speakers controlled by an intelligent voice assistant software program, where a key aspect of user-interface is through voice commands. A voice assistant device can be configured (or otherwise programmed) with specific programmatic routines to perform certain tasks and capabilities in response to user voice commands. One of these capabilities can include making phone calls using built-in microphones of a voice assistant device. Callers can now use voice assistant devices to place phone calls. As such, call centers (or other centralized system that handles a volume of telephone calls) will receive phone calls that have originated from voice assistant devices and typical telecommunications devices (e.g., landline phones, cellular phones). The type of caller-device can be used for various operational purposes, such as tracking caller behaviors and authentication. A problem is determining the type of device that was used to originate the call because such determination is not always accurate, or even possible, simply by listening with a human ear. Embodiments described herein may apply artificial intelligence and/or machine learning techniques both to identify and measure the differences between the audio of calls originating from various types of devices, and to later determine which type of caller-device has originated a later incoming call. In some implementations, the resulting detection models and/or the outputted detection results may be applied in various downstream processes, such as authentication.

Typical telephone calls placed from a user's cell phone or landline phone often differ from voice assistant calls in one or more ways that produce identifiable and measurable characteristics, which can be used by call center systems (e.g., servers) to detect various types of caller-devices. A typical telephone captures speech and produces an audio signal that have distinct features of various types, as compared against an audio signal produced by a voice assistant device. A computing system (e.g., server computer) of the call center can receive, measure, and evaluate the various features of a call's audio signals to generate a classification model for classifying a type of caller-device, or to implement such a classification.

In operation, a computing device (e.g., server computer) of a call center detects calls from voice assistant devices using a classifying model trained with features extracted from phone calls. The computer (or a data collection appliance in communication with the computer) executes various signal processing techniques to identify and extract features from the audio signals of prior calls and incoming calls. The computer may execute a machine learning algorithm to build a classifier around these features.

Examples of the types of features may include, without limitation: reverberation-based features, spectral-based features, noise-based features, and acoustic features, among others. Features may be extracted from segments (sometimes called "frames") of the audio signal or from the entire or nearly-entire (e.g., substantially all of the) audio signal. Shown in Table 1 are non-limiting examples of feature-types and features that may be extracted and the source of the extraction.

TABLE 1

| Feature-Type | Feature | Source Of Extraction |
| --- | --- | --- |
| Reverberation-Based Features | Linear Predictive Coding (LPC) Coding | Segments |
| Spectral-Based Features | Rolloff | Entire or Near-Entire Signal |
| | Flatness | Entire or Near-Entire Signal |
| | Bandwidth | Entire or Near-Entire Signal |
| | Centroid | Entire or Near-Entire Signal |
| | Contrast | Entire or Near-Entire Signal |
| | Harmonic Mean Fast Fourier Transform (FFT) | Entire or Near-Entire Signal |
| | Custom Mel-Frequncy Cepstral Coefficients (MFCCs) | Entire or Near-Entire Signal |
| Noise-Based Features | Signal-To-Noise Ratio (SNR) | Segments |
| Acoustic Features | Short-Window Correlation Cepstral Features | Entire or Near-Entire Signal Segments |

Reverberation-based features may include, for example, calculated statistics based on Linear Predictive Coding (LPC) residual value. The effect of reverberation is often exaggerated on voice assistant calls, which impacts the computed LPC residual that is identifiably distinct from calls originating from typical telephone devices. Oftentimes after a classifier has been trained, the reverberation-based features (e.g., LPC residual value) may provide an identifiable distinction between voice assistant calls and phone calls from other types of devices.

Spectral-based features may include values associated with the relative energy and/or frequency characteristics of the audio signal. There is difference in the spread of energy over the spectral bands between each classification of caller-device—telephone devices and voice assistant devices. The differences are often attributable to, for example, a larger number of microphones used in voice assistant devices, array configuration, differences in noise cancellation, and various speech enhancement techniques. Non-limiting examples of spectral feature values that may be implemented by the system for classification may include: rolloff, flatness, bandwidth, centroid, and contrast. The computing device may further calculate a harmonic mean Fast-Fourier Transform (FFT). The calculated spectral features may further include certain typical or customized mel-frequency cepstral coefficients (MFCCs).

Noise-based features may include signal-to-noise ratio (SNR) estimates calculated by the computing device. Calculated SNRs are oftentimes higher for voice assistant calls. As above, the differences in the SNR values are likely attributable to, for example, a larger number of microphones used in voice assistant devices, array configuration, differences in noise cancellation, and various speech enhancement techniques.

Acoustic features are values representing acoustic characteristics of audio signals. This may include, for example, short-window correlation, and statistical values for cepstral features extracted from an audio signal.

In some embodiments, a computer extracting the features can execute a voice activity detection software program. In such embodiments, the voice activity detection software generates or modifies, a new or existing computer file containing the audio signal having only portions of the audio signal containing speech, thereby producing a computer file with a reduced size. The voice activity detection software may generate the audio segments or some other software program executed by the computer may do so.

Components of a System Embodiment

FIG. 1 shows components of a system 100 for receiving and analyzing telephone calls, according to an embodiment. The system 100 may comprise a call analysis center 101, any number of customer call centers 103a, 103b, and caller devices 106, 108. A call analysis center 101 comprises analytics server 102, databases 104, internal caller devices 106a, 108a, and analyst devices 110. Customer call centers 103a, 103b may comprise external servers 105a, 105b, external databases 107a, 107b, and agent devices 109a, 109b. The system 100 may further comprise user devices 111 in networked communication with the call analysis system 101. The caller devices 106, 108 may include any number of communication devices 106 and any number of voice assistant devices 108. It should be understood that the components of the system 100 are merely illustrative. Other embodiments may include additional or alternative components, or omit components, from the components in the system 100, but are still within the scope of this disclosure. It should be appreciated that FIG. 1 is merely one example of the devices of a system 100. Although FIG. 1 only shows a system 100 having only a few of the various components, it should be appreciated that other embodiments may comprise, be coupled to (via one or more networks), or otherwise implement any number of devices capable of performing the various features and tasks described herein.

The various components of the call analysis center 101 and call centers 103a, 103b may be interconnected with each other, internal and external to the network infrastructures, via hardware and software components of one or more networks. Examples of a network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, caller devices 106, 108 may communicate via telecommunications protocols, hardware, and software, used for hosting and transporting audio signals associated with telephone calls.

It should be appreciated that FIG. 1 is merely one example of the devices of a system 100. Although FIG. 1 shows an illustrative system 100 having a few of the various components, configurations may include, may be coupled to (via one or more networks), or may otherwise implement any number of devices capable of performing the various features and tasks described herein. For example, some configurations may incorporate a database 104 into an analytics server 102, such that these features are integrated within a single device. In a similar example, some embodiments may incorporate an analyst device 110 into an analytics server 102, such that a single computing device performs the features and tasks of such devices. Although only two devices are shown for illustrative purposes, the caller devices 106, 108 in FIG. 1 may represent any number of distinct physical devices, which may originate any number of distinct telephone calls to various destinations respectively. Other embodiments may comprise additional or alternative devices, or may omit devices shown in FIG. 1, and that such alternative embodiments still fall within the scope of this disclosure.

The system 100 of FIG. 1 comprises various network infrastructures 101, 103a, 103b. Each network infrastructure 101, 103a, 103b may comprise computing devices that collect call data generated from phone calls between the caller devices 106, 108 and the respective infrastructure 101, 103a, 103b, and store the call data into a machine-readable storage media, such as a database 104, 107a, 107b. Servers 102, 105a, 105b may then access the call data to execute various operations described herein, including, but not limited to: querying or updating a database 104, 107a, 107b; pre-processing or otherwise conditioning the call data; executing various analytics on call data; and exchanging call data with various devices of the system 100 via one or more networks.

Customer call centers 103a, 103b may also offer the functionality of call analysis center 101 to offer call analytics services to other call centers, which may owned or operated by customers of the analytics service or in some cases may be sub-components of a larger organization. Call center 103a, 103b may have agent devices 109a, 109b, or in some embodiments, data appliance 112a, 112b configured to collect call data generated during phone calls between calling devices 106, 108 and the particular call center 103a, 103b. In some instances, call data collected at the call centers 103a, 103b is stored into an external database 107a, 107b and/or transmitted to an external server 105a, 105b to perform various analytics services. In some instances, the call data collected at the call centers 103a, 103b is transmitted to the call analysis center 101, which may perform various analytics services and/or store the call data.

The call analysis center 101 may comprise any number computing devices configured to collect from various data sources call data generated from phone calls involving caller devices 106, 108 and store the call data into storage media, such as a central database 104. The devices of the call analysis center 101 may also execute various analytics processes on the call data, such as executing software processes for training global or tailored classification models and executing software processes for the classification of various types of caller devices 106, 108. For example, the illustrative call analytics center 101 comprises an analytics server 102 that executes various operations described herein, such as, for example, querying or updating a central database 104 that stores the call data, pre-processing or otherwise conditioning the call data, executing various artificial intelligence and machine learning analytics on the call data, and performing certain actions based on the results of those analytics processes.

The analytics server 102 of call analysis center 101 may execute programmatic training routines that generate one or more classification models for classifying device-types of caller devices 106, 108 and based on historic call data stored in a database 104, or otherwise received from various data sources. Additionally, the analytics server 102 may execute programmatic detection routines that apply a classification model against call data of incoming calls (also referred to as an "ongoing calls" or "recent calls"), in order to automatically determine the device-type of a caller device 106, 108 that originated an incoming call and to detect when the incoming call has originated from a voice assistant device 108. The analytics server 102 may execute various processes and tasks on call data accessible to, or otherwise received by, the call analytics system 101, such as call data received from call centers 103a, 103b, call data received from devices internal to the analytics center 101, and call data received from public user devices 111. The analytics server 102 may transmit outputted data, such as, for example, analytics or classification results, global or tailored classification models, and other data updates, to each of the call centers 103a, 103b or otherwise publish outputted data over the Internet. Additionally or alternatively, the analytics server 102 or another device of the call analytics center 101 may make data stored in the central database 104 available to devices of the call centers 103a, 103b to permit queries, or the analytics server 102 may publish certain output data to a website, web portal, FTP site, or other externally accessible databank hosted by the analytics call center 101 and that is accessible to the call centers 103a, 103b.

It should be appreciated that analytics server 102 may be any kind of computing device comprising a processor, memory, and software and capable of executing various processes and tasks described herein. Non-limiting examples of an analytics server 102 may include a server computer, a desktop computer, a laptop computer, a tablet computer, a smartphone, and any other type of computing device. An analytics server 102 may be coupled to one or more databases 104 and agent devices via one or more networks, allowing the analytics server 102 to communicate (to and from other components of the system 100) various database queries, call data, execution instructions (e.g., execution parameters, triggering inputs, query parameters), and other forms of machine-readable computer data and configurations.

The analytics server 102 may receive call data for phone calls involving caller devices 106, 108, including calls a caller device 106, 108 makes to or receives from a call analysis center 101. In some instances, the analytics server 102 may receive some or all of the call data from another data source, such as a central database 104, call centers 103a, 103b, analyst devices 110, user devices 111 or other third-party system (e.g., carrier node). And in some instances, the analytics server 102 may extract some or all of the call data from an audio signal and streaming data packets for a phone call, directly from a caller device 106, 108 or via a device of a customer call center 103a, 103b. The call data may then be stored into a database 104 for later retrieval and processing. The call data may include an audio signal containing a recording of some or all of the audio that was streamed or otherwise received from the caller device 106, 108, and various types of metadata fields (e.g., phone number, call timestamps, associated protocols, carrier information). It should be appreciated that "call data," as used herein, includes data that could be characterized as metadata or data, based on various data specifications governing, for example, the devices, networking protocols, and telecommunications protocols, among others.

The analytics server 102 may execute various processes to extract features from the call data differently, according to the type of features to be extracted. For some types of features, the analytics server 102 extracts or otherwise generates the features based on substantially all of an audio signal in the call data. For some types of features, the analytics server 102 extracts or otherwise generates the features based on segments (sometimes referred to as "frames") of an audio signal. In such cases, the analytics server 102 parses the audio signal into the segments. These segments may be stored in-memory (e.g., RAM) on the analytics server 102 for execution of one or more processes and/or in a database 104 for later reference. In some implementations, the analytics server 102 may execute an automatic speech recognition (ASR) software program on the audio signal. An ASR program automatically identifies the occurrence of spoken utterances in the audio signal. In some cases, when executing the ASR, the analytics server 102 may output an updated, revised, or new audio signal that contains an abridged version of the audio signal having only the portions of audio signal with spoken utterances. Additionally or alternatively, the ASR may also output the parsed segments.

As mentioned, the analytics server 102 executes training processes that train a classification model based on some corpus of prior calls (e.g., records of call data). The classification model may be trained by executing one or more supervised, unsupervised, or semi-supervised machine learning algorithms. Non-limiting examples of the various algorithms used for training may include: logistic regression, decision tree learning, linear regression, clustering, Gaussian matrix modelling, anomaly detection, convolutional neural network, and deep neural networks, among others. In operation, the analytics server 102 receives the call data from one or more sources (e.g., databases 104, call centers 103a, 103b, analyst devices 110, user devices 111), then extracts features of various types from the call data. At least one of the prior calls in the corpus should be a voice assistant call that originated from a voice assistant device 108, thereby allowing the analytics server 102 to ingest, and algorithmically model, call data associated with known voice assistant calls. In some implementations, the call data may be ingested by the analytics server 102 as one or more labelled sets or data fields that the analytics server 102 references when executing training processes. As an example, during a supervised learning process, an oracle (e.g., an administrative user) "label" field in the call data that indicates the device-type for each prior call and/or indicates whether a prior call was a voice assistant call. For unsupervised or semi-supervised implementations, the analytics server 102 may, for example, execute clustering algorithms and/or Gaussian matrix algorithms in order to algorithmically develop, generate, and identify numerical differences between the various features of voice assistant calls compared to features of non-voice assistant calls. When the classification model is trained, the analytics server 102 may store the trained classification model in memory or on a hard disk of the analytics server 102, store the classification model in a central database 104 of the call analysis center 101, and/or transmit the trained classification model to call centers 103a, 103b for local storage and implementation by external servers 105a, 105b and external databases 107a, 107b.

As mentioned, in some embodiments, the call analysis center 101 may provide call analytics services to one or more external call centers 103a, 103b that are operated by organizational (e.g., corporate) customers of the call analysis center 101. In such embodiments, components of the call analysis center 101, such as analytics server 102 and databases 104, may receive call data from devices of the call centers 103a, 103b, such as external servers 105a, 105b or agent devices 109a, 109b, and perform various processes and tasks on the call data received to generate a classification model. The analytics server 102 may employ a trained classification model to execute classification processes, and/or the analytics server 102 may transmit the trained classification model to various devices of the system 100, such as external servers 105a, 105b of call centers 103a, 103b.

In some implementations, the analytics server 102 may generate global classification models based on call data received from various data sources, where a global classification model is broadly applied to call data by any number of devices of the system 100. For example, the analytics server 102 may train a global classification model using call data received from any number of call centers 103a, 103b, and then distribute the global classification model to external servers 105a, 105b of the call centers 103a, 103b, which may execute classification processes using the global classification model. In such implementations, the call analysis center 101 trains a global classification model once, before deploying the trained classification model for deployment by various devices of the system 100, such as external servers 105a, 105b. As such, the call analysis center 101 provides a ready-to-use (out-of-the-box) trained, global classification model.

Additionally, an external server 105a may be configured to collect call data for calls locally directed to a particular call center 103a, and execute training processes described herein to further refine or tailor the global classification model. In such cases, the external server 105a may generate a tailored classification for the particular call center 103a, based on call data received by that call center 103a or based on certain updates received from the central database 104. In some implementations, in response to a customer's request, the analytics server 102 may generate a tailored classification model for the particular call center 103a using the call data received from that call center 103a or other data sources, and/or the analytics server may otherwise adjust the tailored classification model according to the customer request.

Call centers 103a, 103b may comprise external servers 105a, 105b, external databases 107a, 107b, agent devices 109a, 109b, and data appliances 112a, 112b. An external server 105a, 105b may communicate certain data (e.g., call data, classification models) with the call analysis center 101, execute classification processes, and perform various programmatic processes. The external server 105a, 105b may be any computing device comprising a processor, memory, and software and configured to perform the various processes and tasks described herein.

In operation, the external server 105a, 105b executes classification processes that apply a trained classification model against call data for incoming calls. The external server 105a, 105b receives call data for an incoming call received from an agent device 109a, 109b or other data appliance 112a, 112b. The incoming call may be received by an agent of a call center 103a, 103b, where call data may be received by an agent device 109a, 109b and presented to the agent via a graphical user interface (GUI). A classification process may be automatically invoked when an incoming call or call data is received at the external server 105a, 105b or at the agent computer 109a, 109b, or other device of the call center 103a, 103b. The classification process may also be manually invoked when the agent enters a command into the GUI, which instructs the agent device 109a, 109b to transmit a process-invoking instruction to the external server 105a, 105b. The agent computer 109a, 109b may also transmit or otherwise forward the call data for the incoming call, via one or more networks, to the external server 105a, 105b or to an analytics server 102 of an analysis center 101. The external server 105a, 105b may extract, from the incoming call data, the various features used by a classification model stored in an external database 107a, 107b of the call center 103a, 103b. The external server 105a, 105b may then apply the classification model to the feature-values extracted from the audio signal of the incoming call, which causes the external server 105a, 105b to produce a score predictive of the type of device that originated the incoming call. The outputted device-type score may, for example, represent the likelihood the extracted features (as modeled) come from a particular type of caller device 106, 108. If the device-type score satisfies a certain threshold value, then the external server 105a, 105b determines that the call audio was produced by a voice assistant device 108, and thus the external server 105a, 105b has detected a voice assistant call from the call data of the incoming call.

Although the illustrative system 100 mentions the classification processes as being executed by external servers 105a, 105b, it should be appreciated that, in some embodiments, the analytics server 102 may execute the various classification processes described herein, in addition or as an alternative to the external servers 105a, 105b. In such embodiments, a device of the call center 103a, 103b (e.g., an agent device 109a, 109b) may transmit or stream the call data for the incoming call to an analytics server 102 via one or more networks.

Databases 104, 107a, 107b are computing devices that store various types of data (e.g., call data, classification models, caller profiles) received from various devices of the system 100. Data sources may include, for example, agent computers 109a, 109b, analyst devices 110, external servers 105a, 105b, data capture appliances 112a, 112b, user devices 111, and various network devices (e.g., switches, trunks, routers), among other devices of a system 100. Call data and the various other computing files may be stored in databases 104, 107a, 107b in any number of formats. The data stored in a central database 104 (e.g., global call data, classification models, caller profiles) may be accessible by analytics server 102 and/or analyst devices 110. In some cases, certain data stored in the central database 104 may be accessible to call centers 103a, 103b according to a data sharing policy, whereby external databases 105a, 105b of the call centers are configured to exchange stored data (e.g., download, upload) with the central database 104 at a given interval or based on a triggering event, such as instructions from an agent device 109a, 109b or analyst device 110. Each of the databases 104, 107a, 107b may be hosted on one or more computing devices comprising a processor, memory, and software, and capable of performing the various tasks and processes described herein. In some embodiments, a database 104, 107a, 107b may be integrated into a single computing device with other components of the same network infrastructure 101, 103a, 103b, such as analytics server 102 or external server 105a, 105b. And in some embodiments, like that of FIG. 1, each database 104, 107a, 107b may be hosted on a distinct computing device, and may be in communication with servers 102, 105a, 105b via one or more networks.

An analyst device 110 and agent devices 109a, 109b may be operated by personnel of the call analysis center 101 (e.g., fraud analysts, administrators) or call centers 103a, 103b to configure components of the system 100, such as analytics servers 102 and central databases 104, to execute various analytics processes, generate data outputs, and manage various types of data. Analyst device 110 and agent devices 109a, 109b may be any computing device comprising memory, a processor, and software, and configured for various features and tasks described herein. Non-limiting examples may include a server computer, laptop computer, desktop computer, a tablet computer, and the like. Analyst device 110 may be coupled via one or more networks to analytics server 102 and central databases 104, allowing analyst devices 110 to communicate instructions (e.g., database queries, modeling instructions) to analytics server 102, central databases 104, or other devices of the call analysis center 101. The analyst device 110 may transmit instructions and configuration parameters to analytics server 102 for executing certain processes and to central databases 104 for accessing (e.g., querying, updating) or otherwise managing call data for the system 100. Agent devices 109a, 109b may be coupled via one or more networks to external servers 105a, 105b and external databases 105a, 105b, allowing agent devices 109a, 109b to communicate instructions (e.g., database queries, modeling instructions) to the analytics server 102 of the call analysis center 101 (e.g., via a web portal GUI) or to external servers 105a, 105b within the same call center 103a, 103b. The agent devices 109a, 109b may transmit instructions and configuration parameters to analytics server 102 or external servers 105a, 105b for executing training and/or classification processes and to external databases 105a, 105b for accessing (e.g., querying, updating) call data stored within the corresponding call center 103a, 103b.

Analyst device 110 and agent devices 109a, 109b may have locally executed native software associated with the system 100 that communicates with components of the system 100, such as analytics server 102 or external server 105a, 105b. In some implementations, the analyst device 110 and/or agent devices 109a, 109b may interact with analytics server 102 or external servers 105a, 105b via a browser-based web-portal. Agent devices 109a, 109b may present a user with a GUI allowing an agent of the call center 103a, 103b to review and interact with call data about an ongoing or prior calls and interact with an external server 105a, 105b and/or analytics server 102, and query an external database 105a, 105b. The GUIs presented by analyst devices 110 and agent devices 109a, 109b may be configured to display various execution options for providing instructions and parameters to the analytics server 102, as well as the various inputs and outputs transmitted to and received from the server 102 for executing various training processes, or to external servers 103a, 103b for executing various classification processes. In some cases, the GUI of an agent device 109a, 109b may present an indication that an ongoing call has originated from a voice assistant device 108 or a communication device 106 based on a classification model executed by an external server 105a, 105b or by the agent device 109a, 109b. The GUI of the agent device 109a, 109b may also present results of various downstream processes of the external server 105a, 105b, such as an authentication process, to an agent who may take action accordingly.

As mentioned, there are no existing datasets containing call data for calls that originated from voice assistant devices 108. In some embodiments, an analytics server 102 may receive (or "crowdsource") call data used for training a classification model from a variety of data sources. Call center agents may transmit training call data from the devices of the call centers 103a, 103b (e.g., external databases 107a, 107b, agent devices 109a, 109b) to the analytics server 102 and/or database 104 of the call analysis center. When the agent devices 109a, 109b receive call data (e.g., calls serviced by the agents), some or all of the call data may be presented to the agents. Agents may enter, via a GUI, labels that indicate certain calls are confirmed to be originated from voice assistant devices 108. In some cases, personnel of the call analysis center 101 may further contribute. In such cases, internal caller devices 106a, 108a associated with the call analysis center 101 may originate calls to a phone number of the call analysis center 101. The new training call data is received by a device of the call analysis center 101 and is presented via a GUI of an analyst device 110 to a user who then enters, via the GUI, labels that indicate certain calls are confirmed to be originated from internal voice assistant devices 108a. Additionally or alternatively, the call center 101 may facilitate public or semi-public participation. Public users would use various types of caller devices 106, 108 to place telephone calls to a phone number of the call analysis center 101. The call data for those public call would then be generated and available to a public user via a web portal hosted by a webserver of the call analysis center 101. The user would access the web portal using a public user device 111. A GUI would be presented on the user device 111, allowing the user to enter labels that indicate which of the user's calls were originated from a voice assistant device 108. This annotated call data can be transmitted from the various data sources, as training data, to a central database 104 or directly to the analytics server 102 for executing training processes. During crowdsource training, the various users (e.g., call center agents, personnel of the call analysis center 101, public users) may enter additional fields into the call data (to be used as the training data) based on the information available to the particular user. Non-limiting examples of such additional data fields may include make and model of the voice assistant device 108, distance from caller to voice assistant device 108, and mode-of-usage of a corresponding mobile phone during a call originating from a voice assistant device 108. This information can be further employed to train the classification model, thus used to further discriminate between particular models of voice assistant devices 108.

It should be appreciated that agent devices 109a, 109b and public user devices 111 may be any computing device comprising a processor, memory, and software and capable of performing the various tasks and processes described herein. Non-limiting examples of the agent devices 109a, 109b and user devices 111 may include desktop computers, laptop computers, mobile devices (e.g., smart phones), tablet computers, and the like.

It should also be appreciated that, in embodiments of this disclosure, certain functions and features described as being executed by analyst devices 110 or agent devices 109a, 109b may, in other embodiments, be executed by other devices, such as analytics server 102 or external server 105a, 105b. Likewise, certain functions and features described as being executed by analytics server 102 or external server 105a, 105b may, in other embodiments, be executed by other devices, such as analyst device 110 or agent device 109a, 109b. Moreover, in some embodiments, analytics server 102 or external server 105a, 105b and analyst device 110 or agent device 109a, 109b may be the same computing device.

In some embodiments, call centers 103a, 103b may comprise a data appliance 112a, 112b that is configured to collect and store call data generated from phone calls that originated from caller devices 106, 108. The data appliance 112a, 112b may intercept or otherwise capture computing network traffic and/or telecommunications network traffic that contains certain portions of call data for calls involving the caller devices 106, 108. The data appliance 112a, 112b then transmits the intercepted call data to an external server 105a, 105b or external database 107a, 107b of the same call center 103a, 103b monitored by the particular data appliance 112a, 112b; or the data appliance 112a, 112b may transmit the intercept network traffic containing the call data directly to devices of the call analysis center 101 (e.g., analytics server 102, central database 104).

Caller devices 106, 108 (including internal caller devices 106a, 108a) may be any communications or computing device that callers can use to place a telephone call to a call analysis center 101 or other destination by employing various processes and protocols associated with telecommunications. As used herein, caller devices 106, 108 include communication devices 106 and voice assistant devices 108. Caller devices may capture audible utterances from the speech of the caller and generate a machine-readable audio signal using a particular codec.

Communication devices 106 may be any device comprising telecommunications as an integrated design feature and/or additional software process. Non-limiting examples of a communication device 106 may include a landline telephone, a mobile/cellular phone, and a personal computer executing software implementing VoIP protocols (e.g., Skype®).

Voice assistant devices 108 are often (but not always) a "smart speaker" product (e.g., Amazon Echo®, Google Home®) or other "smart" product that functions according to a voice-based, intelligent assistant, operating system. A voice assistant device 108 may be any device having a processor that executes software routines that are responsive to a voice command interface. In the system 100, a voice assistant device 108 is configured to execute software capable of utilizing the telecommunications features of a paired, or otherwise internetworked, device. For example, when making a telephone call to a call center 103a, 103b the voice assistant device 108 uses the phone number assigned to a telephone (e.g., cell phone, landline phone). In some cases, the telecommunications protocols are handled by the telephone and the telephone carrier. In such cases, the voice assistant device 108 operates as a mere interface between the caller and the telephone, whereby the audible inputs (caller's spoken utterances) and outputs (agent's utterances) are presented via the speaker of the voice assistant device 108, yet the telecommunications exchange is performed by the telephone. The voice assistant device 108 may exchange the audible inputs/outputs with the telephone via a short-distance wireless protocol (e.g., Bluetooth®, WiFi®). The voice assistant device 108 may be configured with firmware and/or software that implements a VoIP protocol in order to place a voice assistant call, thereby enabling the voice assistant device 108 to communicate with the call centers 103a, 103b directly using telecommunications protocols. In such cases, the voice assistant device 108 may "borrow" the phone number assigned to the related telephone, which is exchanged via a short-distance wireless protocol, where the voice assistant device 108 employs the phone number assigned to the telephone in header data and other aspects of the VoIP protocol. In either case, the telephone number can be received at devices of a call center 103a, 103b as a caller identifier (caller ID), which is ordinarily used as an initial or superficial factor for identifying or authenticating the caller.

Typical calls placed from a communication device 106 (e.g., mobile phone, landline phone) may differ from voice assistant calls place from voice assistant devices 108 in one or more ways. These differences may result in identifiable and measurable characteristics that an analytics server 102 and/or external server 105a, 105b can extract, model, and evaluate to detect voice assistant calls. For example, a communication device 106, such as a mobile phone, may use a different codec to capture, encode, and transmit audible utterances via one or more networks. These codecs are typically different from the codecs used by voice assistant devices 108 to capture and encode audible utterances. This is only an example, as other differences exist as well.

As mentioned, the call analysis center 101 may perform the classification tasks on the customer's behalf, or the customer call center 103a, 103b may comprise external server 105a, 105b configured to perform the classification task using the classification model received from the analytics server 102 of the call analysis center 101. For example, in some implementations, after the analytics server 102 of the call analysis center 101 has generated the classification model for a particular customer, the server 102 may transmit, via one or more networks, the classification model to an external server 105a, 105b of the customer's external call center 103a, 103b infrastructure. In such implementations, the external servers 105a, 105b are configured to reference the generated classification model when executing various aspects of the classification algorithms described herein in order to classify a type of caller-device 106, 108 that has originated a call to that particular external call center 103a, 103b. In these implementations, the customer performs the classification task.

As an alternative example, in some implementations, the call analysis center 101 may execute the classification processes on the customer's behalf. After the analytics server 102 of the call center 101 has generated the classification model for a particular customer, the classification model may be stored into a database 104 of the call analysis center 101 and associated with prior or incoming call data received from that particular customer's external call center 103a, 103b. In such implementations, the analytics server 102 may receive instructions from an agent device 109a, 109b of the customer's external call center 103a, 103b infrastructure to execute a classification algorithm. The analytics server 102 may further receive, from the agent device 109a, 109b, a dataset or data stream containing new call data for an incoming call, ongoing call, or recent call, in conjunction with the instructions to execute the classification algorithm. The analytics server 102 retrieves, from the central database 104 using one or more customer keys or identifiers (e.g., IP address, pre-stored credentials), the classification model associated with the particular customer's external call center 103a, 103b infrastructure, and then executes the classification algorithms utilizing the classification model. In these implementations, the call analysis center 101 performs the classification task on behalf of the customer, often in a cloud-based or web-application implementation hosted on a webserver of the call analysis center 101.

Example Processes

Training Process

Figure 2:
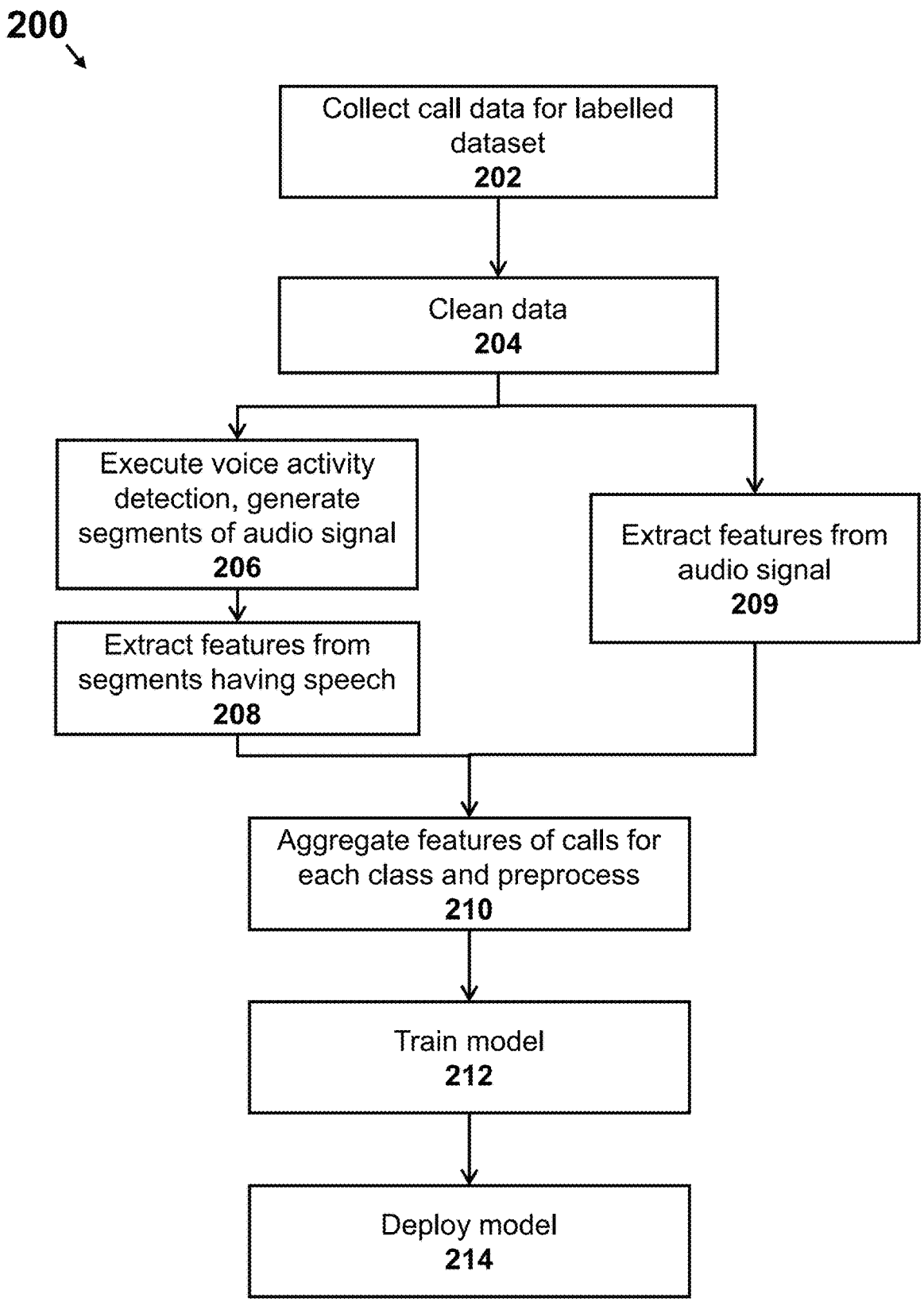
FIG. 2 is a flowchart showing execution steps for training a classification model, according to an embodiment.

FIG. 2 is a flowchart showing execution steps for training a classifier model according to a process 200. The process 200 may be executed by one or more computing devices of a call analysis service, such as a server or the like. Although the steps of the process 200 may be performed by multiple computing devices, the following description details a single computer implementing the steps. It should also be understood that the steps shown and described herein are merely illustrative and additional, alternative, and fewer number of steps should be considered to be within the scope of this disclosure.

In a first step 202, the computer collects call data for any number of past calls. This call data is ingested or otherwise collected in order to execute processes for training a classification model. In some embodiments, the call analysis systems may implement a crowdsourcing effort, whereby the training call data is received from a variety of client computers, which may include any number of computing devices of any type capable of performing the various processes described herein (e.g., desktop computer, laptop computers, tablet computers, mobile devices). The training call data may include user-entered labels that indicate certain call data originated from a particular type of device (e.g., mobile phone, landline phone, voice assistant device).

In a next step 204, the computer cleans the training call data. Cleaning the call data may include automated and/or manual user-implemented processes. For example, in some implementations, the computer may remove noise from the audio signals and a user may further refine that automated process. As another example, a user may review the accuracy of labels assigned to the call data to confirm the label accurately associate the call data with the correct device-types from which the call data originated.

As another example, the computer and/or client computers may implement a manual, user-guided scrubbing process to eliminate excess or inaccurate data points. Additionally or alternatively, the computer or user may review the spectrograms of calls from various device-types and listen to those calls, to confirm there are differences in the labels in view of the visual and audible differences. For instance, if an administrative review were to visually inspect the spectrograms and listen to the audio of calls from different types of devices, there should be some differences in the labels. If, for some reason, a user (e.g., call center agent, analyst of call analysis center, public user) entered call data for only a single type of device, then such errors could be identifiable by visual and audio inspection of the spectrograms and audio signals.

In some cases, trained classification models may exist in machine-readable storage, on the computer or on networked devices of a local network infrastructure that includes the computer (e.g., call analysis center, customer call center). In such cases, previously trained classification models can be updated or otherwise tailored with the incoming call data, or may the existing classification models may be employed as to generate or confirm the proximity of various calculations, feature extractions, or various other determinations.

In further examples, the computer may de-duplicate certain redundant data records to reduce processing requirements. The computer may also execute one or more application programmable interfaces (APIs) that programmatically convert, reformat, or otherwise translate incoming certain data records formatted according to a data source's specification, into a specification expected and implemented by the computer. Additionally or alternatively, the computer may clean and pre-process the incoming call data by converting, reformatting, or otherwise translating certain data records of the call data to satisfy a model specification that is valid for the classification model, and then feed that call data into the machine learning-based classification model.

After cleaning the data in present step 204, the computer extracts features from the call data of the phone calls, in steps 206, 208, 209. Some types of features are extracted from audio segments of an audio signal, as in later steps 206, 208. Some types of features are extracted from substantially entire audio signals, as in later step 209. Although the process 200 contemplates extracting features of both feature-types, it should be appreciated that other embodiments may extract features from either only audio segments or only an audio signal. It should also be appreciated that although the process 200 describes steps for extracting features in a certain order, as in steps 206, 208, 209, no particular order of execution is required in various embodiments.

In step 206, the computer parses the audio signals of the call data into audio segments (sometimes called "frames"). The training processes executed by the computer may parse the audio signal into segments having a fixed or variable length. In some embodiments, the computer may execute voice activity detection software that automatically detects instances of speech utterances in an audio signal. In such embodiments, the computer may generate audio segments from only those portions of the audio signal containing utterances. The computer may then store the audio segments into memory (e.g., RAM) or into a database.

In step 208, the computer extracts features of one or more types using the audio segments that were parsed from audio signals of the prior call data. The feature-types extracted from the audio segments may include, without limitation, reverberation-based features, noise-based features, and acoustic features, among others. When extracting features, the computer calculates statistical and/or representational values for each of the features being extracted. As an example, for reverberation-based features, the computer executes a linear predictive coding (LPC) algorithm on the audio segments to generate one or more values characterizing the audio signal, which may include a residue or residual value. The computer may then execute a machine learning and/or statistical algorithm (e.g., logistic regression, linear regression) to output a statistical value for the audio signal (across the audio segments) for each particular feature or type of feature (e.g., reverberation feature). Additionally or alternatively, the computer may then execute a machine learning algorithm to output statistical value for various features that are numerically predictive of each type of device. It should be appreciated that computer may execute the same or different machine learning algorithms when extracting each of the various features.

In step 209, the computer extracts features of one or more types from all (or nearly all) of audio signals of the prior calls. The feature-types extracted from a full audio signal may include, without limitation, spectral-based features and certain acoustic features, among others. In some implementations, the entire audio signal includes only those portions of the audio signal having speech. In such implementations, the computer may execute a voice activity detection software program that detects speech utterances in the audio signal.

Similar to the prior step 208, when extracting features from whole audio signals in the current step 209, the computer calculates statistical and/or representational values for each of the features being extracted. As an example, for spectral-based features, the computer executes algorithms that, for example, generate one or more values characterizing the spectrum (e.g., energy distribution) of the audio signal; these algorithms may include, for example, calculating values for the spectral rolloff, spectral centroid, bandwidth, flatness, and contrast of an audio signal. The computer may then execute a machine learning and/or statistical algorithm (e.g., logistic regression, linear regression) to output one or more spectral-based statistical values predictive of each type of device. It should be appreciated that the computer may execute the same or different machine learning algorithms when extracting each of the various features.

In step 210, the computer aggregates the extracted features for each of the device-types (e.g., mobile phone, landline phone, voice assistant device) and performs one or more preprocessing routines on the aggregated data containing the extracted features. The computer may store, in memory and/or in a database, the aggregated data as new data records or as updates to the existing call data. The aggregated data may contain indicators or fields that correlate or otherwise associate the aggregated data to the respective device-types.

Additionally or alternatively, in some embodiments, the computer may execute preprocessing routines, such as normalizing or standardizing the extracted feature sets using the same of call data. In such embodiments, one or more standardizing parameters for the feature sets may be included with a classification model being trained by the process 200, thereby allowing the computer to normalize the corresponding features extracted from later-ingested call data. In some implementations, an administrative user enters a standardizing parameter via a GUI of the computer or another device. And in some implementations, the computer automatically determines the standardizing parameter according to statistical algorithms that, for example, identify outlier values or otherwise output a standardizing parameter.

In step 212, the computer trains the machine-learning classification model using the feature sets extracted from the call data. The classification model may be trained to ingest and evaluate the features, when extracted from call data (for a particular call), in order to detect when a call has originated from a voice assistant device or another type of device (e.g., a mobile phone, landline phone). Additionally or alternatively, the classification model could be used to determine more granular knowledge of the voice assistance device, such as the device model (e.g. Amazon Echo®). The training processes executed by the computer may be unsupervised, supervised, or semi-supervised. The call data includes the call data for at least one voice assistant call. For instance, in the process 200, the computer may execute various logistic regression algorithms on one or more extracted features. The computer may organize or cluster the values of the extracted features and associate the various features with particular device-types. Any number of machine-learning algorithms may be employed in order to train the classification model.

In step 214, the trained classification model is deployed for execution in production environments, which may include one or more network infrastructures (e.g., call analysis center, customer call centers). The computer may store the trained model in memory or into a database from which computers may receive the classification model for later executing classification processes against incoming calls. When deployed into a customer call center system, or other network infrastructure, computers of that system may receive incoming call data for an incoming calls, retrieve the trained classification model from a database of the same or different infrastructure, and then execute classification routines against the incoming call data using the trained classification model.

Classification Process

Figure 3:
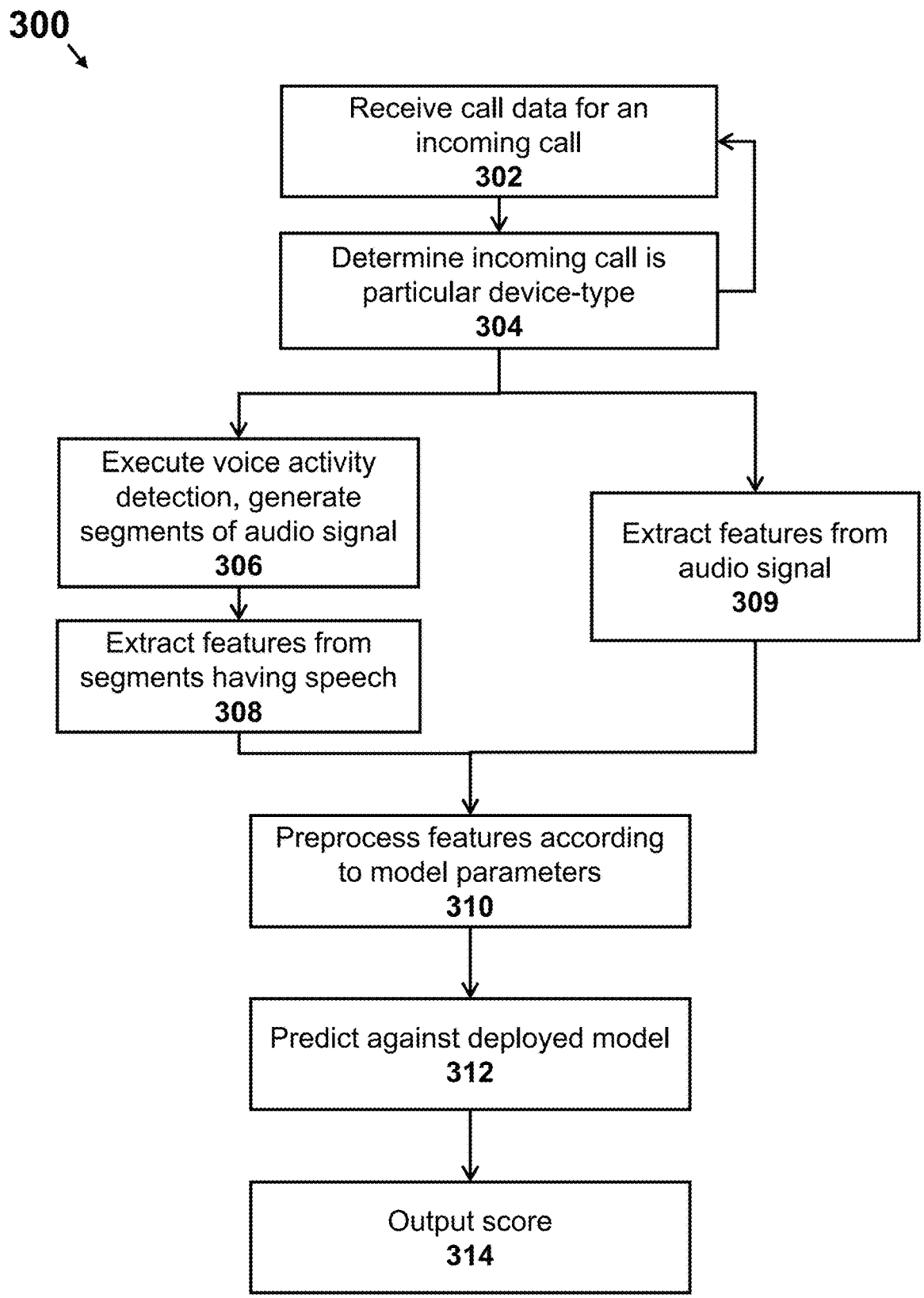
FIG. 3 is a flowchart showing execution steps for detecting voice assistant devices using a trained classification model, according to an embodiment.

FIG. 3 is a flowchart showing execution steps for detecting voice assistant devices using a trained classifier model, according to a process 300. The process 300 may be executed by one or more computing devices of a call center, such as a server or the like. In the illustrative process 300, a computer may execute the steps below using a trained classification model generated by a computing device of a call analysis service, where the classification model is stored into (and retrieved from) a database of the same call center as the computer executing the illustrative process 300. Although the steps of the process 300 may be performed by multiple computing devices, the following description details a single computer implementing the steps. It should also be understood that the steps shown and described herein are merely illustrative and that additional, alternative, and fewer steps should be considered to be within the scope of this disclosure.

In a first step 302, a computer may receive call data for a call that is incoming, ongoing, or otherwise relatively recent (referred to herein as an "incoming call" for ease and brevity). The call data for the incoming call may be received from any number of devices of the call center system capable of capturing, generating, or otherwise receiving call data. Such devices may include a client computer operated by a call center agent, a data capture appliance configured to intercept and forward various forms of network traffic, or a database of the call center that provides call data in response to queries from the computer, among other potential devices. The call data of the incoming call includes an audio signal, which may be a machine-readable data format (e.g., .wav) that represents the speaker utterances and that was generated according to a codec of a caller device. The call data may also include metadata, which may be appended or otherwise transmitted with the audio signal by the caller device, a carrier network, or a client computer device.

In a next step 304, the computer may perform an initial review of the metadata of the incoming call data to confirm whether the caller device is readily identifiable as a particular type of caller-device. If the computer determines, based upon the metadata, the device-type of the incoming call is a telephone (e.g., cellular phone, landline phone) or otherwise appears to be from a telephone, then the computer proceeds with the process 300 of classification. If the computer determines based on the metadata the call is not from a telephone, then the computer has determined the call is likely from a VoIP call, and so the computer waits to receive new call data for a new incoming call at prior step 302.

A voice assistant device typically "borrows" or otherwise employs the telephone number assigned to a paired telephone. A VoIP call often does not; such VoIP calls often have assigned telephone numbers provided by a software developer or hosting service, and often do not rely upon telecommunications protocols of carrier systems. Functionally, VoIP call is often designed to mimic conventional telephone functionality and provide the familiar appearance and experience of telephone at the user-level, though technologically the VoIP calls often do not implement telecommunications protocols or technologies in the same way as telephones, if at all. As such, the metadata of an incoming call originated from a VoIP call will be relatively different from the metadata of incoming calls that originated from telephones and voice assistant devices.

After reviewing the metadata of the incoming call at present step 304, the computer extracts features from the call data of the incoming call in later steps 306, 308, 309. The features to be extracted are based upon the features utilized by the classification model employed by the computer. As before, some types of features are extracted from audio segments of an audio signal, as in later steps 306, 308; and some types of features are extracted from substantially entire audio signals, as in later step 309. Although the process 300 contemplates extracting features of both feature-types, other embodiments may extract features from either only audio segments or only an audio signal. Although the process 300 describes steps for extracting features in a certain order, as in steps 306, 308, 309, no particular order of execution is required in various embodiments.

In step 306, the computer parses the audio signal of the incoming call data into audio segments (sometimes called "frames"). The classification processes executed by the computer may parse the audio signal into segments having a fixed or variable length. In some embodiments, the computer may execute voice activity detection software that automatically detects instances of speech utterances in the audio signal. In such embodiments, the computer may generate audio segments from only the portions of the incoming audio signal containing utterances. The computer may then store the audio segments into memory (e.g., RAM) or into a database.

In step 308, the computer extracts the features from the audio segments, as required by the classification model. The feature-types extracted from the audio segments may include, without limitation, reverberation-based features, noise-based features, and acoustic features, among others. When extracting features, the computer calculates statistical and/or representational values for each of the features being extracted. As an example, for reverberation-based features, the computer executes a linear predictive coding (LPC) algorithm on the audio segments to generate one or more values characterizing the audio signal, which may include a residue or residual value.

In some implementations, the computer may then execute a statistical algorithm (e.g., logistic regression, linear regression) to output statistical value for the audio signal (across the audio segments) for the particular type of feature. Additionally or alternatively, the computer may execute a statistical algorithm to output a statistical value for the particular type feature that may be used as a score indicative of how "close" the value is to similar values in prior call data. The computer may execute the same or different statistical algorithms when extracting each of the various features.

In step 309, the computer extracts features of one or more types from all (or nearly all) of the audio signal of the incoming call. The types of features extracted from a full audio signal may include, without limitation, spectral-based features and certain acoustic features, among others. In some implementations, the entire audio signal includes only those portions of the audio signal having speech. In such implementations, the computer may execute a voice activity detection software program that detects speech utterances in the audio signal.

Similar to the prior step 308, when extracting features from whole audio signal in the current step 209, the computer calculates statistical and/or representational values for each of the features being extracted. As an example, for spectral-based features, the computer executes algorithms that, for example, generate one or more values characterizing the spectrum (e.g., energy distribution) of the audio signal; these algorithms may include, for example, calculating values for the spectral rolloff, spectral centroid, bandwidth, flatness, and contrast of an audio signal. In some implementations, the computer may then execute a statistical algorithm (e.g., logistic regression, linear regression) to output one or more spectral-based statistical values indicative of the type of caller device. It should be appreciated that the computer may execute the same or different machine learning algorithms when extracting each of the various features.

In some cases, when extracting features of various types, in prior steps 306, 308, 309, as the computer generates one or more statistical parameters for particular features (e.g., LPC residual, spectral rolloff, SNR, short-window correlation) or types of features (e.g., reverberation-based features, spectral-based features, noise-based features, acoustic features) of the audio signal, the computer may append each of the statistical features to a dataset of features for the incoming call that the computer stores in-memory (e.g., RAM), which the computer may reference to, for example, execute one or more later steps 310, 312, 314 of the classification process 300; store into a database for later training or re-training processes; and/or reference when executing other downstream processes requiring the dataset.

In step 310, the computer executes one or more preprocessing routines that, for example, standardize the extracted features for the incoming call according to a standardizing parameter stored and associated with the classification model. The computer executing the deployed classification model standardizes the features before executing the classification routines.

In step 312, the computer executes the classification routines that employ the trained classification model. The standardized features are fed into the classification model, which in turn, causes the computer to generate a score predicting or otherwise indicating the likelihood of the type of caller-device that originated the incoming call.

In step 314, the computer generates the final score, which the computer or other device of the call center system uses to determine whether, based on some predictive likelihood threshold, the incoming call originated from a voice assistant device. If the computer determines the score satisfies the threshold, then the computer has detected a voice assistant device.

The computer may be programmed to execute one or more downstream processes based upon detecting a voice assistant call. In some embodiments, the incoming call may be authenticating or the authentication may fail, based on whether the caller-device type must be a particular predetermined type of device. Additionally or alternatively, the computer or other devices of the call center system may execute certain downstream processes that track and update a caller profile data record in a database. These processes may include, for example, caller behavior profiling for marketing or behavioral tracking purposes, or authentication profiling where pre-stored information about the (e.g., registered/expected caller-device types) may be referenced during an authentication process. The computer may reference, update, or otherwise manage profile record data for a caller based on detecting that a present/recent incoming call originated from a voice assistant device.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for detecting certain types of caller devices, the method comprising:
receiving, by a computer, call data for an incoming call, the call data comprising an audio signal and metadata;
extracting, by a computer, one or more feature-types from the audio signal of the call data for the incoming call, the one or more feature-types including a reverberation-based feature;
generating, by the computer using a classifier model applied on the one or more feature-types including the reverberation-based feature extracted from the call data of the incoming call, a device-type score for the incoming call based upon the one or more feature-types and the metadata of the call data for the incoming call, wherein the classifier model is trained to detect a type of device that originated a corresponding call according to the call data for a plurality of calls, the call data including the reverberation-based feature; and determining, by the computer, that the incoming call originated from a voice assistant device in response to determining that the device-type score for the incoming call satisfies a threshold value.

2. The method according to claim 1, wherein extracting the one or more feature-types comprises, for at least one feature-type:
generating, by the computer, a plurality of audio segments parsed from the audio signal of the incoming call; and
extracting, by the computer, one or more features of the at least one feature-type from the plurality of audio segments.

3. The method according to claim 2, wherein a feature-type of the at least one feature-type is selected from the group consisting of a reverberation-based feature or features, one or more acoustic features, and sound-to-noise ratio features.

4. The method according to claim 2, wherein the computer generates the plurality of segments by executing a voice activity detector program configured to generate the plurality of segments parsed from the audio signal, wherein each segment of the plurality of segments generated by the voice activity detector program contains a spoken utterance.

5. The method according to claim 1, wherein extracting the one or more feature-types comprises extracting, by the computer, one or more features of the at least one feature-type based upon an entire audio signal.

6. The method according to claim 5, wherein a feature-type of the at least one feature-type is selected from the group consisting of a spectral feature, custom mel frequency cepstral coefficients (MFCC) spectral features, a harmonic mean spectral feature, and a short-window correlation acoustic feature.

7. The method according to claim 1, wherein the classifier model is associated with one or more standardization parameters, and wherein generating the device-type score for the incoming call using the classifier model comprises standardizing, by the computer, values of each respective feature-type according to a standardization parameter corresponding respectively to each feature-type.

8. The method according to claim 1, wherein receiving the call data for the incoming call comprises storing, into a database, the call data for each respective call of the plurality of calls.

9. The method according to claim 1, wherein the call data for the plurality of calls used to train the classification model includes at least one call originated from a voice assistant device.

10. The method according to claim 1, further comprising generating, by the computer, an indicator via a GUI of a client computer that the incoming call originated from the voice assistant device in response to the computer determining that the device-type score satisfies the threshold.

11. The method according to claim 1, wherein extracting one or more features of a feature-type from each respective call comprises:
generating, by the computer, one or more statistical parameters based upon a linear predictive coding residual of the audio signal; and
appending, by the computer, the one or more statistical parameters as a reverberation feature of the one or more features of the respective call data.

12. The method according to claim 1, wherein extracting one or more features of a feature-type from each respective call comprises:

generating, by the computer, one or more statistical parameters based upon at least one of: a spectral rolloff of the audio signal, a spectral contrast of the audio signal, a spectral flatness of the audio signal, a spectral bandwidth of the audio signal, a spectral centroid of the audio signal, and a Fast Fourier Transform of the audio signal; and
appending, by the computer, the one or more statistical parameters as one or more spectral-based features of the one or more features of the respective call data.

13. A computer-implemented method for detecting certain types of caller devices, the method comprising:
receiving, by a computer, call data for a plurality of calls, the call data for each respective call comprising an audio signal and metadata of the respective call, wherein the plurality of calls includes one or more voice assistant calls that involved one or more voice assistant devices, the call data for each voice assistant call indicates a device-type is a voice assistant device;
for each respective call in the plurality of calls, extracting, by the computer, one or more feature-types from the audio signal of the call data including a reverberation-based feature;
training, by the computer, a classification model to detect a type of device that originated the corresponding call based on the one or more feature-types including the reverberation-based feature extracted from the call data of the plurality of calls, wherein the classifier model is trained to generate a device-type score according to one or more machine-learning algorithms used for the one or more feature-types;
generating, by the computer, one or more standardization parameters for the classification model, wherein each feature-type is normalized according to a corresponding standardization parameter;
storing, by the computer, the classification model in a machine-readable storage; and
identifying, by the computer, that an incoming call is a voice assistant call involving a voice assistant device based upon the device-type score for the incoming call generated by applying the classification model on the call data of an incoming call.

14. The method according to claim 13, wherein extracting the one or more feature-types comprises, for the call data of each respective call:
generating, by the computer, a plurality of audio segments parsed from the audio signal of the respective call data; and
extracting, by the computer, one or more features of a feature-type from the plurality of audio segments.

15. The method according to claim 13, wherein the feature-type is selected from the group consisting of a reverberation-based feature, one or more cepstral acoustic features, and a sound-to-noise ratio.

16. The method according to claim 13, wherein the computer generates the plurality of segments from each respective call audio by executing a voice activity detector program configured to generate the plurality of segments parsed from the audio signal of the respective call data, wherein each segment of the plurality of segments generated by the voice activity detector program contains a spoken utterance.

17. The method according to claim 13, wherein extracting the one or more feature-types comprises extracting, by the computer, one or more features of a feature-type based upon an entire audio signal.

18. The method according to claim 17, wherein a feature-type of the at least one feature-type is selected from the group consisting of a spectral feature, custom mel frequency cepstral coefficients (MFCC) spectral features, a harmonic mean spectral feature, and a short-window correlation acoustic feature.

19. The method according to claim 13, wherein receiving the call data for the plurality of calls comprises storing, into the database, the call data for each respective call of the plurality of calls.

20. The method according to claim 13, wherein extracting one or more features of a feature-type from each respective call comprises:
generating, by the computer, one or more statistical parameters based upon a linear predictive coding residual of the audio signal; and
appending, by the computer, the one or more statistical parameters as a reverberation feature of the one or more features of the respective call data.

21. The method according to claim 13, wherein extracting one or more features of a feature-type from each respective call comprises:
generating, by the computer, one or more statistical parameters based upon at least one of: a spectral rolloff of the audio signal, a spectral contrast of the audio signal, a spectral flatness of the audio signal, a spectral bandwidth of the audio signal, a spectral centroid of the audio signal, and a Fast Fourier Transform of the audio signal; and
appending, by the computer, the one or more statistical parameters as one or more spectral-based features of the one or more features of the respective call data.

22. The method according to claim 13, wherein extracting one or more features of a feature type from each respective call comprises:
extracting, by the computer, mel frequency cepstral coefficients of the audio signal; and
appending, by the computer, the mel frequency cepstral coefficients as one or more spectral-based features of the respective call data.

23. The method according to claim 13, wherein extracting one or more features of a feature type from each respective call comprises:
generating, by the computer one or more metrics of a signal-to-noise ratio of the audio signal; and
appending, by the computer, the one or more metrics as a noise-based feature of the one or more features of the respective call data.

24. The method according to claim 13, wherein extracting one or more features of a feature type from each respective call comprises:
generating, by the computer, a short-window correlation measurement from the audio signal; and
appending, by the computer, the short-window correlation measurement as an acoustic feature of the one or more features of the respective call data.

25. The method according to claim 13, for each respective voice assistant call in the plurality of calls:
receiving, by the computer from a client computer, an indicator that the voice assistant call originated from a voice assistant device.

* * * * *